US009905152B2

(12) United States Patent
Sang

(10) Patent No.: US 9,905,152 B2
(45) Date of Patent: Feb. 27, 2018

(54) LIQUID CRYSTAL DISPLAY

(71) Applicant: LG Display Co., Ltd., Seoul (KR)

(72) Inventor: Wookyu Sang, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 64 days.

(21) Appl. No.: 14/984,848

(22) Filed: Dec. 30, 2015

(65) Prior Publication Data

US 2016/0314736 A1 Oct. 27, 2016

(30) Foreign Application Priority Data

Apr. 21, 2015 (KR) ........................ 10-2015-0055806

(51) Int. Cl.
*G09G 3/20* (2006.01)
*G09G 3/36* (2006.01)
*G02F 1/1362* (2006.01)

(52) U.S. Cl.
CPC ..... *G09G 3/2085* (2013.01); *G02F 1/136286* (2013.01); *G09G 3/3607* (2013.01); *G09G 3/3614* (2013.01); *G09G 3/3648* (2013.01); *G09G 3/3674* (2013.01); *G09G 3/3685* (2013.01); *G09G 3/3696* (2013.01); *G09G 2300/0426* (2013.01); *G09G 2300/0452* (2013.01); *G09G 2310/08* (2013.01); *G09G 2320/0233* (2013.01)

(58) Field of Classification Search
CPC .. G09G 3/2085; G09G 3/3607; G09G 3/3614; G09G 3/3648; G09G 3/3685; G09G 3/3696; G09G 3/18; G09G 3/20; G09G 3/36; G09G 3/038; G02F 1/136286; G02F 1/1343; G02F 1/136; G02F 1/1333
See application file for complete search history.

(56) References Cited

U.S. PATENT DOCUMENTS 8,400,383 B2 * 3/2013 Cho .................. G02F 1/136286 345/103
8,462,092 B2 * 6/2013 Hsu ........................ G09G 3/006 345/96
9,343,022 B2 * 5/2016 Park ..................... G09G 3/3607
(Continued)

OTHER PUBLICATIONS

European Extended Search Report, European Application No. 15197596.8, dated Jun. 24, 2016, 12 pages.
(Continued)

*Primary Examiner* — Jennifer Mehmood
*Assistant Examiner* — Sardis F Azongha
(74) *Attorney, Agent, or Firm* — Fenwick & West LLP

(57) ABSTRACT

A liquid crystal display is disclosed. The liquid crystal display includes subpixels of first to fourth colors arranged on each row, a first data line connected to the first color subpixel and the second color subpixel on each row, a second data line connected to the third color subpixel and the fourth color subpixel on each row, a first gate line connected on each row to subpixels of two colors selected among the first to fourth colors, a second gate line connected on each row to subpixels of two remaining colors among the first to fourth colors, a data driver configured to supply a data voltage to the first and second data lines in a time-division manner, and a gate driver configured to supply a gate pulse to the first and second gate lines in synchronization with an output timing of the data voltage.

16 Claims, 10 Drawing Sheets

(56) References Cited

U.S. PATENT DOCUMENTS

| | | | | |
|---|---|---|---|---|
| 9,570,020 | B2 * | 2/2017 | Yoo | G09G 3/3607 |
| 9,613,577 | B2 * | 4/2017 | Hong | G09G 3/3614 |
| 2006/0120160 | A1 | 6/2006 | Park et al. | |
| 2008/0278466 | A1 | 11/2008 | Joo | |
| 2009/0135125 | A1 | 5/2009 | Park | |
| 2009/0290081 | A1 | 11/2009 | Cho et al. | |
| 2010/0110114 | A1 * | 5/2010 | Hashimoto | G09G 3/3614 345/691 |
| 2010/0110359 | A1 * | 5/2010 | Lee | G09G 3/3614 349/149 |
| 2011/0285950 | A1 | 11/2011 | Su et al. | |
| 2012/0098871 | A1 | 4/2012 | Park et al. | |
| 2012/0105494 | A1 * | 5/2012 | Lee | G09G 3/3614 345/690 |
| 2014/0125647 | A1 * | 5/2014 | Shin | G09G 3/3648 345/212 |
| 2015/0029080 | A1 | 1/2015 | Kwon et al. | |
| 2016/0299391 | A1 * | 10/2016 | Liu | G02F 1/134336 |

OTHER PUBLICATIONS

European Examination Report, European Application No. 15197596.8, dated Apr. 13, 2017, 9 pages.

* cited by examiner

LIQUID CRYSTAL DISPLAY

This application claims the benefit of Korea Patent Application No. 10-2015-0055806 filed on Apr. 21, 2015, the entire content of which is incorporated herein by reference for all purposes as if fully set forth herein.

BACKGROUND

Field of the Disclosure

Embodiments of the present disclosure relate to a liquid crystal display, in which a pixel includes at least three subpixels of different colors.

Discussion of the Related Art

Various flat panel displays, such as a liquid crystal display (LCD), a plasma display panel (PDP), an organic light emitting diode (OLED) display, and an electrophoresis display (EPD), have been developed. An LCD displays an image by controlling an electric field applied to liquid crystal molecules based on a data voltage. In an active matrix liquid crystal display, a pixel includes a thin film transistor (TFT).

The liquid crystal display includes a liquid crystal display panel, a backlight unit irradiating light onto the liquid crystal display panel, source driver integrated circuits (ICs) for supplying a data voltage to data lines of the liquid crystal display panel, gate driver ICs for supplying a gate pulse (or a scan pulse) to gate lines (or scan lines) of the liquid crystal display panel, a control circuit for controlling the source driver ICs and the gate driver ICs, a light source driving circuit for driving light sources of the backlight unit, and the like.

In some recently developed LCDs, a white (W) subpixel is included in pixels having a red (R) subpixel, a green (G) subpixel, and a blue (B) subpixel. In the following description, the display device, in which pixels are divided into R, G, B, and W subpixels, is referred to as an RGBW type display device. The W subpixel increases a luminance of the pixel and reduces a luminance of the backlight unit, thereby reducing power consumption of the liquid crystal display.

Various methods capable of reducing the number of source driver ICs have been attempted so as to reduce the cost of a large-screen display device having a high resolution. However, a luminance deviation between lines of a display panel may result from non-uniform charging states of pixels, an imbalanced distribution of polarities of the pixels, or other factors, thereby leading to a reduction in the image quality.

SUMMARY

A liquid crystal display device is disclosed that includes subpixels of at least three different colors and that are and may prevent or reduce a luminance deviation between horizontal lines of a display panel and may be driven according to methods disclosed herein.

The liquid crystal display device described herein may reduce power consumption and production costs.

According to one aspect, data voltages of positive and negative polarity are supplied to subpixels of the same color during one gate pulse or during one horizontal period. Thus, a polarity bias during a horizontal period can be prevented or reduced, thus preventing or reducing a shift of a common voltage and horizontal crosstalk. A data line may be connected to subpixels of two different colors. That is, the data lines may not be connected to subpixels of all of the colors, e.g., R, G, B, and W. A polarity of a data voltage supplied to a data line may be maintained during one frame period. That is, the polarity of the data voltage for a certain data line may remain unchanged during a frame period, so that no data transition in the data output channels of a source driver IC is required. By these means, power consumption of the liquid crystal display device may be decreased.

According to one example, a liquid crystal display device is provided, comprising a plurality of subpixels of at least three different colors, a plurality of first and second data lines, a plurality of first and second gate lines, a data driver configured to supply a data voltage of one polarity (e.g., positive or negative) to the first data lines and a data voltage of an opposite polarity to the second data lines during a frame period, and a gate driver configured to supply a gate pulse to the first and second gate lines, wherein subpixels of one row, which are connected to the same gate line, are connected to the first and second data lines driven with different polarities during a frame period, respectively. Some of the subpixels connected to the same gate line have the same color and include subpixels connected to the first data lines and subpixels connected to the second data lines. That is, subpixels connected to the same gate line and having the same color may include both subpixels connected to data lines supplied with data voltages of opposite polarities.

In the example, the subpixels may be arranged in a matrix comprising a plurality of rows, e.g., in the horizontal direction, and a plurality of columns, e.g., in the vertical direction. The subpixels of at least three different colors are arranged in each row of a plurality of rows. The gate lines may extend along the direction of the rows, i.e. parallel thereto, and the data lines may extend along the direction of the columns. The subpixels of each row are connected to two different gate lines. Two subpixels of each row may be connected to the same data line. That is, the display device may be a double-rate driving display device, thus reducing the number of source driver ICs. The data driver is configured to supply the data voltages in a time division manner. Also, the data driver may be configured to apply a horizontal 2-dot column inversion drive scheme. The gate driver may be configured to supply the gate pulse in synchronization with an output timing of the data voltage.

Two gate lines may be arranged between two adjacent rows of subpixels. The subpixels arranged on one row may be connected alternately to an odd-numbered gate line and to an even-numbered gate line. Subsequent odd-numbered gate lines may be connected to subpixels arranged in even-numbered and odd-numbered columns, respectively. The same may be the case for even-numbered gate lines Thus, odd-numbered gate lines connected to subpixels arranged in even-numbered columns and odd-numbered gate lines connected to subpixels arranged in odd-numbered columns may alternate. In other words, a first odd-numbered gate line may be connected to even-numbered subpixels and an adjacent second odd-numbered gate line, i.e. subsequent to the first gate line, may be connected to odd-numbered subpixels. Thus, a first (e.g., odd-numbered) gate line may be connected to subpixels arranged in first adjacent, e.g., odd-numbered, columns. Furthermore, a second (e.g., odd-numbered) gate line, which is next but one to the first gate line, may be connected to subpixels arranged in adjacent second, e.g., even-numbered, columns, which are different from the first columns. Odd-numbered and even-numbered refers to the sequential order or the arrangement of the respective gate line, data line, row, or column. That is odd-numbered and even-numbered objects are alternating. It is noted that the starting point for enumerating gate lines, data lines, rows, or columns is selected to facilitate description of the embodiments and may be altered without deviating from the principles of the present disclosure.

The data lines may be connected to two subpixels arranged in the same row. Subpixels connected to the same data line are connected to different gate lines. The subpixels of one column may be alternately connected to an even-numbered and an adjacent odd-numbered data line.

Subpixels of three different colors may be arranged in each row, e.g., in alternate order, e.g., RGB, RGB, or any permutation thereof. Here, subpixels of the same color may be arranged in each column line.

Subpixels of four different colors may be arranged on each row, e.g., in alternate order, e.g., RGBW, RGBW, or any permutation thereof. Subpixels of two different colors may be arranged alternately in one column line. One data line may be connected to subpixels of two different colors. That is, subpixels of a first and second color may be connected to even-numbered data lines, while subpixels of a third and fourth color may be connected to odd-numbered data lines. Subpixels of the same color and arranged in the same column may be connected to the same data line. Subpixels of the same color and arranged in the same column may be connected to the same type of gate line, the type of gate line including either even-numbered or odd-numbered gate lines.

The subpixels in one column may be connected to the same data line. Odd-numbered subpixels, i.e. subpixels of odd-numbered columns, may be connected to odd-numbered data lines. Likewise, within the one row, the even-numbered subpixels, i.e. the subpixels of even-numbered columns, may be connected to even-numbered data lines. Subpixels in one column may be connected to the same type of gate line, the type of gate line being either even-numbered or odd-numbered. Two adjacent subpixels in one row may be connected to one gate line, e.g., an odd-numbered gate line. The subsequent two adjacent subpixels in said one row may be connected to another gate line, e.g., an even-numbered gate line. Hence, groups of two adjacent subpixels connected to an even-numbered gate line and groups of two adjacent subpixels connected to an odd-numbered gate line may be alternately arranged within each row. Here, an odd-numbered data line may be arranged between the two adjacent subpixels, which may be both connected to the odd-numbered gate line. Likewise, an even-numbered data line may be arranged between the two adjacent subpixels, which may be both connected to the even-numbered gate line. Two first data lines may be adjacent, i.e. subsequent, to each other, followed by two second data lines. Thus, two data lines of the same polarity may be adjacent to each other, alternating with two data lines of the other polarity. A common voltage line may be located between two data lines supplied data voltages of a same polarity during a frame period. For example, a common voltage line is provided between two columns, which are disposed between two data lines of the same polarity. That is, the common voltage line may be located between two columns, the columns being between two first data lines or two second data lines. The common voltage line may be formed extending in parallel to the columns or data lines. By these means, a common voltage delay phenomenon may be reduced or eliminated in a direction perpendicular to the common voltage line, thereby preventing luminance deviation.

A first gate pulse applied to the first gate line may be synchronized with the data voltage supplied to subpixels of odd-numbered columns in a first row. A second gate pulse applied to the second gate line may be synchronized with the data voltage supplied to subpixels of even-numbered columns in the first row. Row may refer to a horizontal or x-direction, while column may refer to a vertical or y-direction.

According to a further aspect, a method for driving a liquid crystal display device described herein, includes supplying a data voltage of negative polarity to first data lines and a data voltage of positive polarity to second data lines, and supplying a gate pulse to one of first and second gate lines, wherein the gate pulse is supplied to subpixels of one row, which have the same color and are connected to the first and second data lines with different polarities. The gate pulse is supplied in synchronization with an output timing of the data voltage. In particular, a first gate pulse applied to the first gate line may be synchronized with the data voltage supplied to subpixels of odd-numbered columns in a first row, and a second gate pulse applied to the second gate line may be synchronized with the data voltage supplied to subpixels of even-numbered columns in the first row. The data voltages may be supplied in a time division manner. Also, a horizontal 2-dot column inversion drive scheme may be applied. The other various features described herein may also be realized in the method, as far as applicable.

In one embodiment, there is a liquid crystal display comprising subpixels of first to fourth colors arranged on each row, a first data line connected to the first color subpixel and the second color subpixel on each row, a second data line connected to the third color subpixel and the fourth color subpixel on each row, a first gate line connected, on reach row, to subpixels of two colors selected among the first to fourth colors, a second gate line on each row, to subpixels of two remaining colors of the first to fourth colors, where the two remaining colors are different from the two selected colors, a data driver configured to supply a data voltage to the first and second data lines in a time-division manner, where the data driver maintains, during a frame period, a polarity of the data voltage supplied to the first data line and a polarity of the data voltage supplied to the second data line, and a gate driver configured to supply a gate pulse to the first and second gate lines in synchronization with an output timing of the data voltage.

According to another aspect, a method is provided for driving a liquid crystal display device, e.g., a liquid crystal display device as described herein, wherein data voltage of a first polarity and data voltage of a second polarity are supplied to subpixels of the same color and connected to the same gate line, the first polarity being opposite to the second polarity, where positive polarity and negative polarity are opposite polarities. The polarity of each data line may be maintained during one frame period. A two-dot column inversion drive may be applied. According to one example, the method drives a liquid crystal display device comprising a plurality of subpixels of at least three colors arranged in a matrix with a plurality of rows and columns, a plurality of gate lines extending along the rows, and a plurality of data lines extending along the columns. The method includes supplying a data voltage of a first polarity and a data voltage of a second polarity opposite to the first polarity to the data lines, where the data voltage of the first polarity and the data voltage of the second polarity is supplied, respectively, to subpixels having the same color and being connected to the same gate line during a gate pulse supplied to said gate line.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Reference will now be made in detail to embodiments of the invention, examples of which are illustrated in the accompanying drawings. Wherever possible, the same reference numbers will be used throughout the drawings to refer to the same or like parts. Detailed description of known arts will be omitted if it is determined that such description may obscure the disclosed embodiments.

Figure 1:
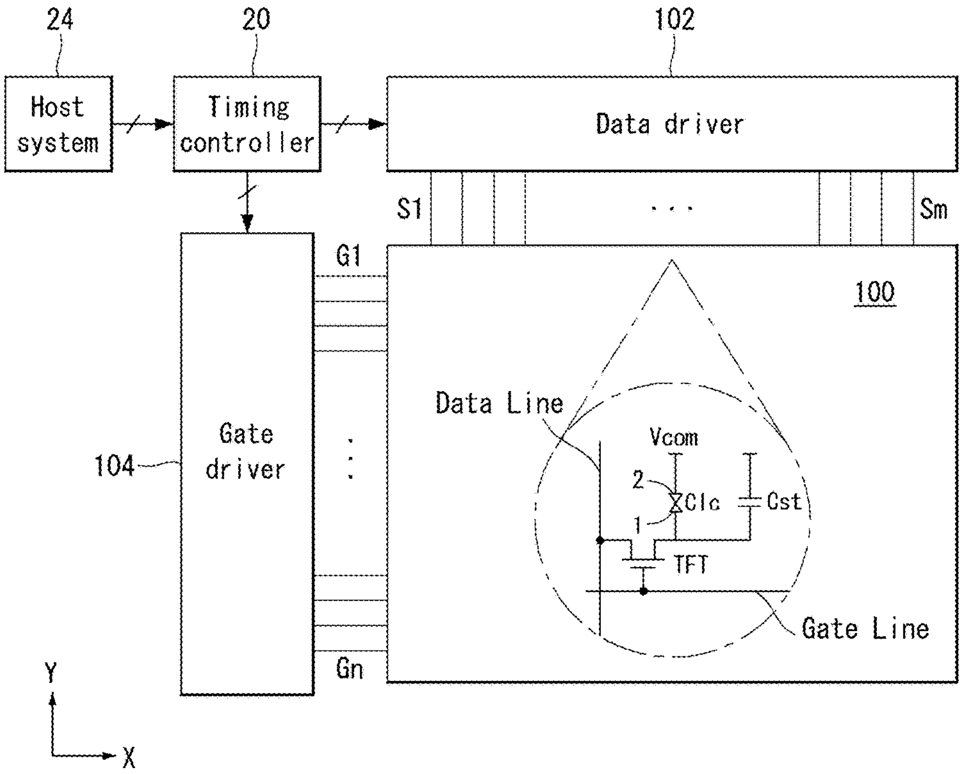
FIG. 1 is a block diagram showing a liquid crystal display according to an embodiment.

Referring to FIG. 1, a liquid crystal display according to an embodiment includes a display panel 100 including a pixel array and a display panel driving circuit for writing data of an input image on the display panel 100. A backlight unit for irradiating light onto the display panel 100 may be disposed under the display panel 100.

The liquid crystal display according to the embodiment is implemented as a double-rate driving (DRD) display device, in which two subpixels, adjacent to each other in a horizontal direction (for example, an x-axis direction or a row direction), share one data line with each other, so as to reduce the number of source driver integrated circuits (ICs). In the DRD display device, the number of source driver ICs may be reduced by a factor of one half. Further, in the DRD display device, an operating frequency of the source driver IC may double relative to a non-DRD display device.

The display panel 100 includes an upper substrate and a lower substrate, which are positioned opposite each other with a liquid crystal layer interposed between the upper substrate and the lower substrate. The pixel array of the display panel 100 includes pixels arranged in a matrix form based on a crossing structure of data lines S1 to Sm and gate lines G1 to Gn.

The lower substrate of the display panel 100 includes the data lines S1 to Sm, the gate lines G1 to Gn, thin film transistors (TFTs), pixel electrodes 1 connected to the TFTs, storage capacitors Cst connected to the pixel electrodes 1, and the like. A pixel adjusts a transmission amount of light using liquid crystal molecules driven by a voltage difference between the pixel electrode 1 charged to a data voltage through the TFT and a common electrode 2, to which a common voltage Vcom is supplied, thereby displaying an image of video data. A color filter array including black matrixes and color filters is formed on the upper substrate of the display panel 100. In a vertical electric field driving manner such as a twisted nematic (TN) mode or a vertical alignment (VA) mode, the common electrode 2 is formed on the upper substrate. In a horizontal electric field driving manner such as an in-plane switching (IPS) mode and a fringe field switching (FFS) mode, the common electrode 2 is formed on the lower substrate along with the pixel electrode 1. Polarizing plates are respectively attached to the upper substrate and the lower substrate of the display panel 100. Alignment layers for setting a pre-tilt angle of liquid crystals are formed on the upper substrate and the lower substrate of the display panel 100.

The liquid crystal display according to the embodiment may be implemented as any type liquid crystal display including a transmissive liquid crystal display, a transflective liquid crystal display, and a reflective liquid crystal display. The transmissive liquid crystal display and the transflective liquid crystal display include a backlight unit. The backlight unit may be implemented as a direct type backlight unit or an edge type backlight unit.

The display panel driving circuit writes the data of the input image on the pixels. The data written on the pixels include red (R) data, green (G) data, blue (B) data, and white (W) data. The display panel driving circuit includes a data driver 102, a gate driver 104, and a timing controller 20.

The data driver 102 includes a plurality of source driver ICs. Data output channels of the source driver ICs are connected to the data lines S1 to Sm of the pixel array. The source driver ICs receive digital video data of the input image from the timing controller 20. The digital video data transmitted to the source driver ICs include R data, G data, B data, and W data. The source driver ICs convert the RGBW digital video data of the input image into positive and negative gamma compensation voltages under the control of the timing controller 20 and output positive and negative data voltages. An output voltage of the source driver ICs is supplied to the data lines S1 to Sm.

A pixel includes an R subpixel, a G subpixel, a B subpixel, and a W subpixel. The two horizontally adjacent subpixels share a data line and are charged with time-divided data voltages through the data line. The data line sharing structure can reduce the number of data lines by a factor of one half compared to a general pixel array structure at the same resolution and thus can reduce the number of source driver ICs to drive the pixel array.

The source driver ICs supply the positive or negative data voltage to the data lines. The data voltage supplied to the data lines maintains the same polarity during at least one frame period.

The gate driver 104 sequentially supplies gate pulses to the gate lines G1 to Gn under the control of the timing controller 20. The gate pulses output from the gate driver 104 are synchronized with positive and negative video data voltages, to which the pixels will be charged. The gate driver 104 may be directly formed on the lower substrate of the display panel 100 along with the pixel array in the same manufacturing process, so as to reduce the cost of ICs.

The timing controller 20 converts RGB data of the input image received from a host system 24 into RGBW data and transmits the RGBW data to the data driver 102. The timing controller 20 receives timing signals synchronized with the data of the input image from the host system 24. The timing signals include a vertical sync signal Vsync, a horizontal sync signal Hsync, a data enable signal DE, a dot clock DCLK, another signal, or a combination thereof. The timing controller 20 controls operation timing of the data driver 102 and the gate driver 104 based on the timing signals Vsync, Hsync, DE, and DCLK received along with pixel data of the input image. The timing controller 20 may transmit a polarity control signal POL for controlling polarities of the pixel array to the source driver ICs of the data driver 102.

The host system 24 may be implemented as a television system, a set-top box, a navigation system, a DVD player, a Blu-ray player, a personal computer (PC), a home theater system, a phone system, or a combination thereof.

Figure 2:
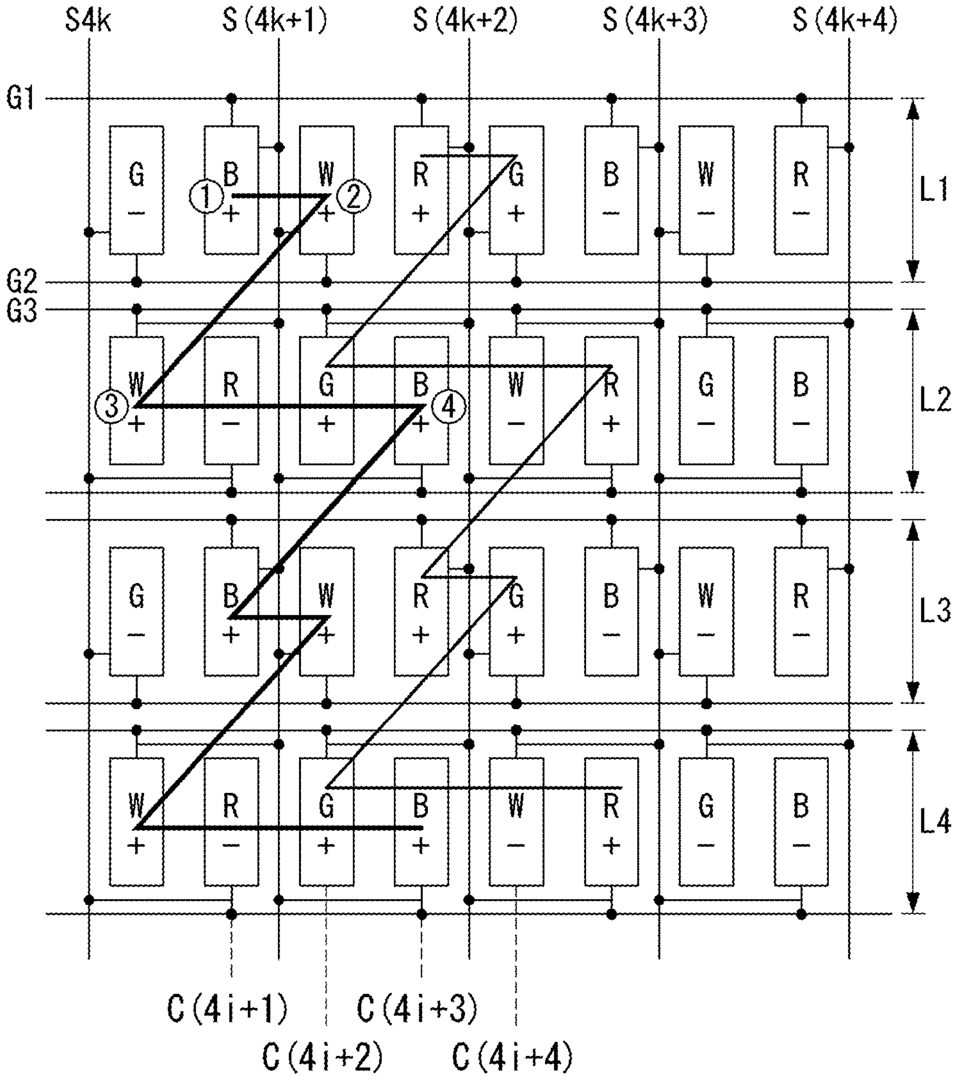
FIGS. 2 and 3 illustrate a structure of a pixel array and a charge order of a data voltage according to a first embodiment.
Figure 3:
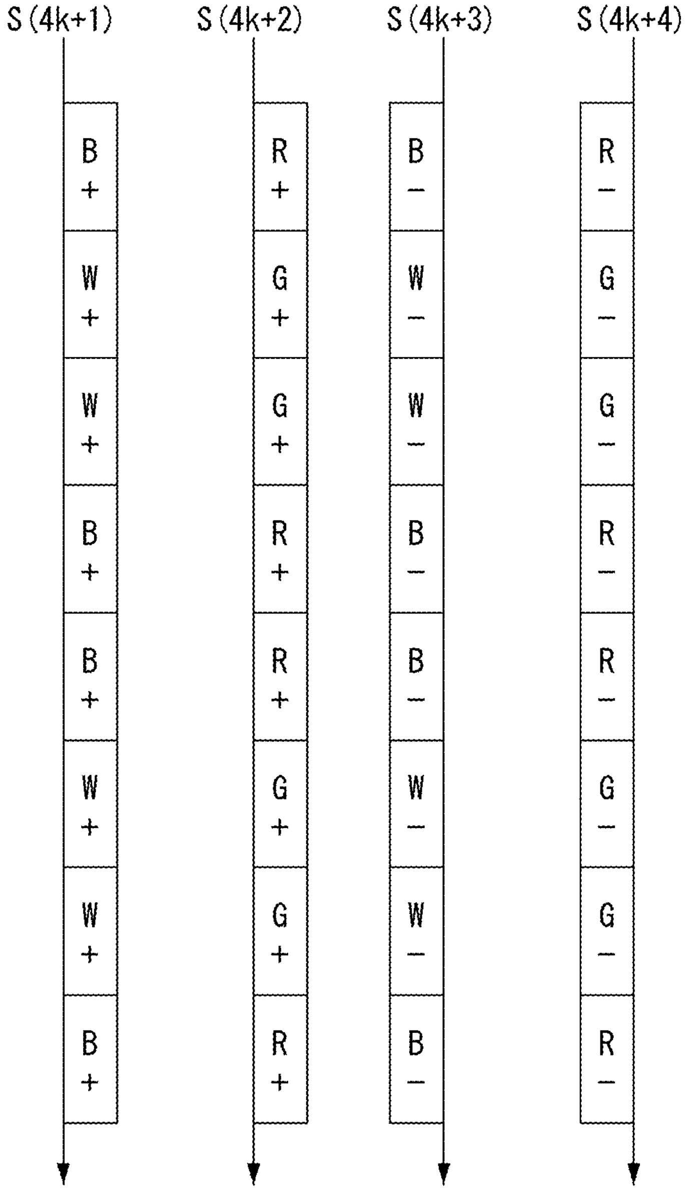

FIGS. 2 and 3 show a structure of a pixel array and a charge order of a data voltage according to a first embodiment. In FIG. 2, "L1 to L4" denote rows of the display panel 100 arranged in the horizontal direction.

Referring to FIG. 2, the pixel array according to the first embodiment includes subpixels of first to fourth colors arranged along the rows of the horizontal direction. The first color subpixel is a white (W) subpixel, the second color subpixel is a red (R) subpixel, the third color subpixel is a green (G) subpixel, and the fourth color subpixel is a blue (B) subpixel. Subpixels of two colors are alternately arranged on a column line. For example, the B subpixels and the R subpixels are alternately disposed on a (4i+1)th column C(4i+1), and the W subpixels and the G subpixels are alternately disposed on a (4i+2)th column C(4i+2), where "i" is a non-negative integer, i>0. That is, in FIG. 2, only a middle part of the panel is shown starting from data line S4k and column C4i.

Thus, B subpixels are disposed at crossings of the (4i+1)th column C(4i+1) and the odd-numbered rows L1 and L3. R subpixels are disposed at crossings of the (4i+1)th column C(4i+1) and the even-numbered rows L2 and L4.

W subpixels are disposed at crossings of the (4i+2)th column C(4i+2) and the odd-numbered rows L1 and L3. G subpixels are disposed at crossings of the (4i+2)th column C(4i+2) and the even-numbered rows L2 and L4.

R subpixels are disposed at crossings of a (4i+3)th column C(4i+3) and the odd-numbered rows L1 and L3. B subpixels are disposed at crossings of the (4i+3)th column C(4i+3) and the even-numbered rows L2 and L4.

G subpixels are disposed at crossings of a (4i+4)th column C(4i+4) and the odd-numbered rows L1 and L3. W subpixels are disposed at crossings of the (4i+4)th column C(4i+4) and the even-numbered rows L2 and L4.

A (4k+1)th data line S(4k+1) is connected to the B subpixel and the W subpixel arranged on a row, where "k" is a non-negative integer, k≥0. In particular, the (4k+1)th data line S(4k+1) is connected to the B subpixels and the W subpixels arranged on the (4i+1)th column C(4i+1) and the (4i+2)th column C(4i+2) of the odd-numbered rows L1 and L3 and is connected to the W subpixels and the B subpixels arranged on each of a (4i)th column and the (4i+3)th column C(4i+3) of the even-numbered rows L2 and L4.

A (4k+2)th data line S(4k+2) is connected to the R subpixel and the G subpixel arranged on a row. In particular, the (4k+2)th data line S(4k+2) is connected to the R subpixels and the G subpixels arranged on the (4i+3)th column C(4i+3) and the (4i+4)th column C(4i+4) of the odd-numbered rows L1 and L3 and is connected to the G subpixels and the R subpixels arranged on each of the (4i+2)th column C(4i+2) and a (4i+5)th column of the even-numbered rows L2 and L4.

Two gate lines may be arranged between two adjacent rows Li, e.g., gate lines G2 and G3 between rows L1 and L2. The subpixels arranged on one row Li may be connected alternately to an odd-numbered gate line and to an even-numbered gate line. For example, the subpixels on row L1 are alternately connected to gate lines G1 and G2. For example, the first gate line G1 is connected to odd-numbered subpixels among the subpixels arranged on the first row L1, and the second gate line G2 is connected to even-numbered subpixels among the subpixels arranged on the first row L1. For example, the first gate line G1 is connected to the B and R subpixels on the first row L1, and the second gate line G2 is connected to the W and G subpixels on the first row L1. Adjacent odd-numbered gate lines may be connected to subpixels arranged in even-numbered and odd-numbered columns, respectively, so that odd-numbered gate lines connected to subpixels arranged in even-numbered columns and odd-numbered gate lines connected to subpixels arranged in odd-numbered columns alternate. For instance, odd-numbered gate line G1 is connected to odd-numbered columns C(4i+1) and C(4i+3), and adjacent odd-numbered gate line G3 is connected to even-numbered columns C(4i+2) and C(4i+4). In other words, a first odd-numbered gate line may be connected to even-numbered subpixels and an adjacent second odd-numbered gate line may be connected to odd-numbered subpixels.

The source driver IC performs horizontal 2-dot column inversion driving. Namely, the source driver IC supplies the positive data voltage to the (4k+1)th and (4k+2)th data lines S(4k+1) and S(4k+2) and supplies the negative data voltage to the (4k+3)th and (4k+4)th data lines S(4k+3) and S(4k+4). A polarity relationship of the data voltage supplied to data lines is equally maintained between the data lines. That is, the polarity itself may change in a frame inversion mode, so that the source driver IC supplies the negative data voltage to the (4k+1)th and (4k+2)th data lines S(4k+1) and S(4k+2) and supplies the positive data voltage to the (4k+3)th and (4k+4)th data lines S(4k+3) and S(4k+4) in a subsequent frame.

The gate driver 104 sequentially supplies the gate pulses to the gate lines. A first gate pulse supplied to the first gate line G1 is synchronized with the data voltage supplied to the odd-numbered columns disposed on the first row L1. A second gate pulse supplied to the second gate line G2 is synchronized with the data voltage supplied to the even-numbered columns disposed on the first row L1. That is, the gate pulses of the gate lines are synchronized with the data voltages supplied via the data lines.

As a result, in the pixel array according to the first embodiment, the subpixels connected to the (4k+1)th data line S(4k+1) are charged to the data voltage of the same polarity in order of (1) the B subpixel of the first row L1, (2) the W subpixel of the first row L1, (3) the W subpixel of the second row L2, and (4) the B subpixel of the second row L2. Further, the subpixels connected to the (4k+2)th data line S(4k+2) are charged to the data voltage of the same polarity in the order of the R subpixel of the first row L1, the G subpixel of the first row L1 the G subpixel of the second row L2, and the R subpixel of the second row L2.

As described above, in the liquid crystal display having the structure of the pixel array according to the first embodiment, the positive and negative polarities of the data voltages supplied to the subpixels of the same color arranged on a row are balanced. Thus, the liquid crystal display according to the first embodiment can prevent or reduce a horizontal crosstalk generated by an imbalance of the polarities of the data voltages supplied to the subpixels arranged on a row.

This is described in detail below.

In general, for a liquid crystal display panel with pixels including W subpixels, the subpixels of the four colors are connected to the data lines S(4k+1), S(4k+2), S(4k+3), and S(4k+4). In the comparative example of FIG. 4, the subpixels of the same color arranged on the same column are alternately connected to odd-numbered data lines and even-numbered data lines. The polarity of the data voltage supplied to the data lines is changed at regular intervals for a vertical dot inversion drive.

Figure 4:
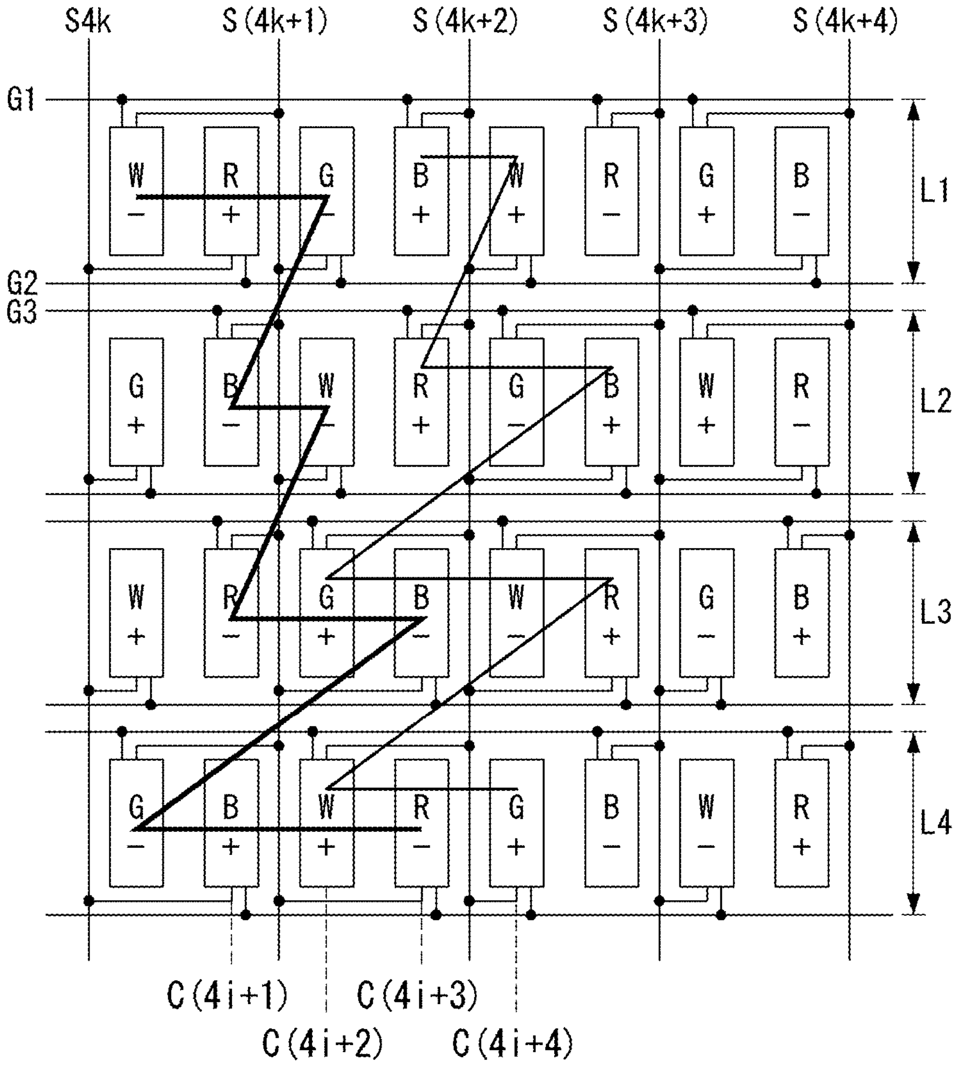
FIGS. 4, 5, and 6 illustrate a structure of a pixel array and a charge order of a data voltage according to a comparative example.
Figure 5:
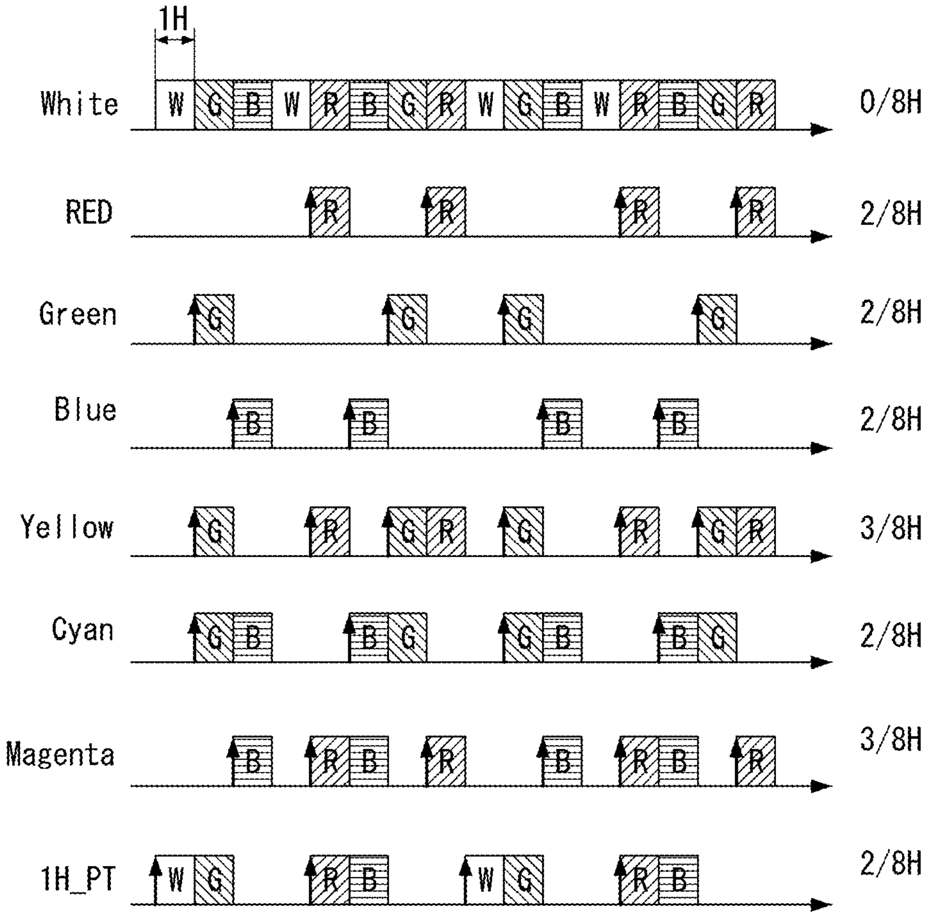

FIG. 4 illustrates a structure of a time-division type pixel array, in which W subpixels are included in the pixels, according to a comparative example. FIG. 5 shows an output of the data voltage supplied to the (4k+1)th data line S(4k+1) in the comparative example shown in FIG. 4. As shown in FIGS. 4 and 5, in a liquid crystal display according to the comparative example, a polarity of the data voltage supplied to the data lines is changed based on a horizontal period. A data transition occurs where there is a large change in an output of the data voltage supplied to the data line, such as a change between positive polarity and negative polarity. FIG. 5 illustrates that the number of data transition operations to represent a single color or a mixed color increases in the comparative example of FIGS. 4 and 5. On the right side of FIG. 5, the numbers of data transition operations in order to realize the respective colors are indicated. That is, for white, no transition occurs in 8 horizontal periods (8H). The pattern is repeated over 8 horizontal periods (8H), so 2 transitions per pattern repetition (2/8H) occur to represent the color red. To represent cyan, green and blue subpixels are turned on. Because the green and blue subpixels are adjacently connected to one data line, only 2 transitions (2/8H) per pattern repetition occur to represent the cyan color. For 1H_PT, the data transition occurred at 2 times during 8H. The color 1H_PT corresponds to odd lines (L1, L3, . . . ) displaying white at the same time even lines (L2, L4, . . . ) display black, or vice versa. The transitions for a data line enable connecting the data line to pixels of the colors R, G, B, and W. Namely, when the liquid crystal display according to the comparative example represents colors other than a white color, the number of data transition operations increases. Therefore, power consumption and heat generation increase in the liquid crystal display according to the comparative example.

Figure 6:
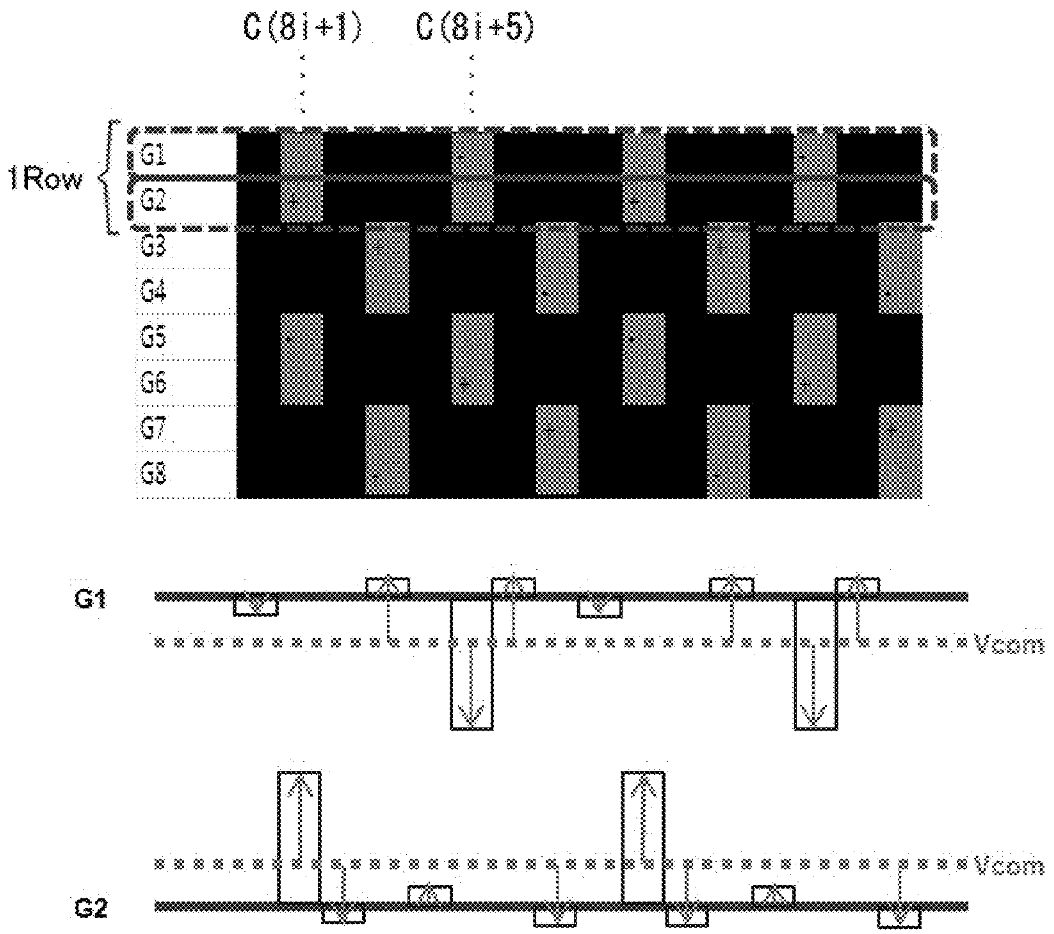

In a process for representing the single color, the common voltage may be shifted, and adjacent subpixels may undesirably emit light. FIG. 6 shows red subpixels and charge timing of the gate pulse charged to the red subpixels for representing a red color in the liquid crystal display according to the comparative example. Referring to FIG. 6, in the liquid crystal display according to the comparative example, on row L1, R subpixels arranged on a (8i+1)th column line (C[8i+1]) are connected to the second gate line G2, and R subpixels arranged on a (8i+5)th column line (C[8i+5]) are connected to the first gate line G1. As a result, red subpixels arranged on a first row L1 emit light in response to scanning timing of a first gate pulse and a second gate pulse to the first gate line G1 and the second gate line G2. The red subpixels arranged on the first row L1 receive the negative data voltage during a supply period of the first gate pulse and receive the positive data voltage during a supply period of the second gate pulse. In the comparative example, because the subpixels arranged on the same row receive the data voltage of the same polarity during the same horizontal period, a polarity bias of the data voltages is generated in a row. As shown in FIG. 6, the polarity bias of the data voltages generates the shift of the common voltage in a polarity direction of the data voltage. The subpixels arranged on a first row L1 are supplied with negative R data voltage during the first gate pulse through the first gate line G1, and the subpixels arranged on a first row L1 are supplied with positive R data voltage during the second gate pulse through the second gate line G2. Therefore, a common voltage supplied to subpixels arranged on a first low L1 is shifted to negative (relative to a ground voltage) during the first gate pulse through the first gate line G1, and the common voltage supplied to subpixels arranged on the first row L1 is shifted to positive during the second gate pulse through the second gate line G2. When the common voltage supplied along the direction of the row is shifted, the subpixels arranged on the corresponding row may represent an undesired gray level.

On the other hand, as shown in FIG. 3, in the liquid crystal display according to the first embodiment, because the positive and negative polarities of the data voltages supplied to the subpixels of the same color are balanced during the same horizontal period, i.e. positive and negative data voltages are supplied to subpixels of the same color and in the same row during one gate pulse, the polarity bias is not generated (or is reduced) during the same horizontal period. Thus, the liquid crystal display according to the first embodiment may prevent a positive or negative shift of the common voltage resulting from the polarity bias of the data voltages within a row of the subpixels. Hence, the liquid crystal display according to the first embodiment may prevent (or reduce) horizontal crosstalk resulting from the shift of the common voltage.

Further, as shown in FIG. 3, in the liquid crystal display according to the first embodiment, the data voltage supplied to a data line maintains the same polarity during a pattern repetition. Thus, because there is no data transition in the data output channels of the source driver IC during a pattern repetition, the power consumption of the liquid crystal display according to the first embodiment may decrease. In a subsequent pattern repetition (e.g., during a subsequent frame), the respective polarities of the data lines may be reversed to provide an overall balance of polarities used to drive the subpixels over time, thereby preventing effects associated with consistently unbalanced polarities over time.

The first embodiment describes the liquid crystal display including the WRGB subpixels in the DRD structure. However, the structure of the pixel array according to the first embodiment may also be applied to a liquid crystal display, in which subpixels of three primary colors (RGB) form one pixel.

Figure 7:
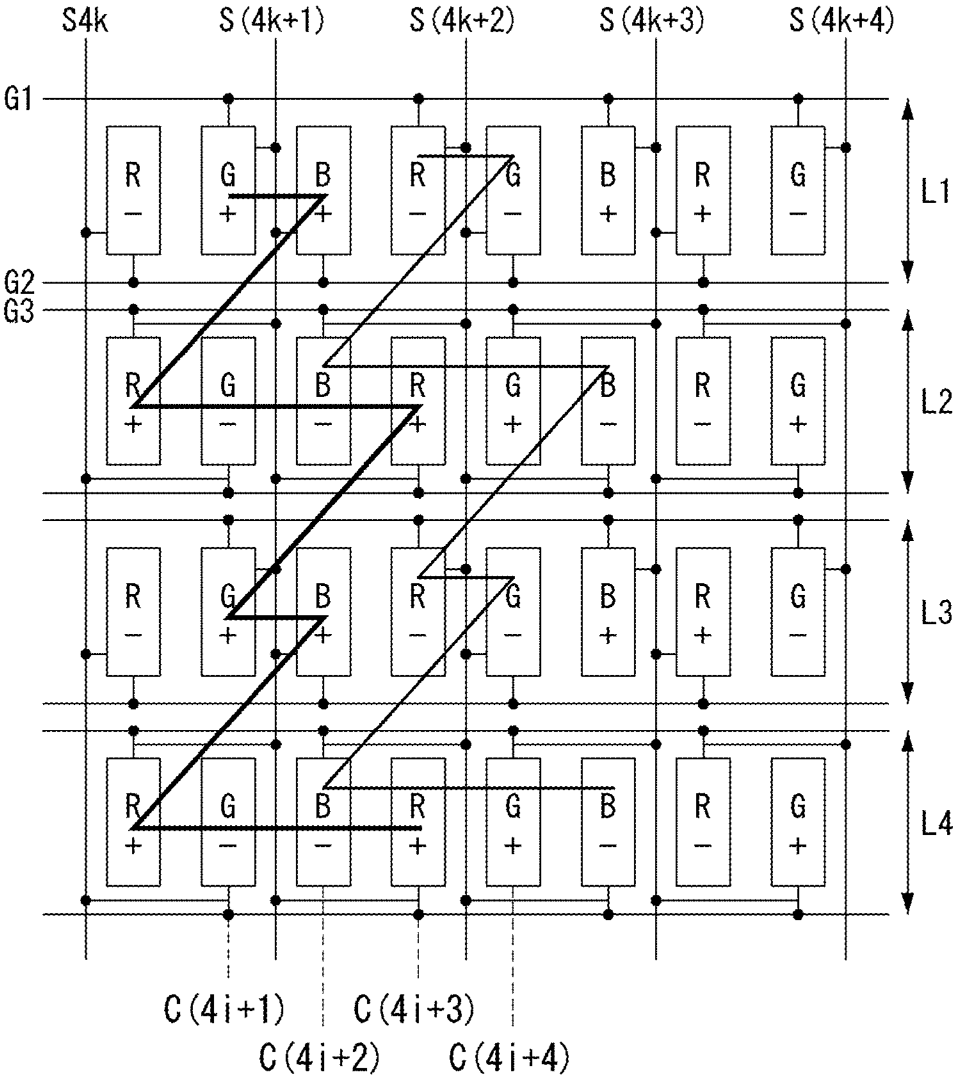
FIGS. 7 and 8 illustrate a structure of a pixel array and a charge order of a data voltage according to a second embodiment.
Figure 8:
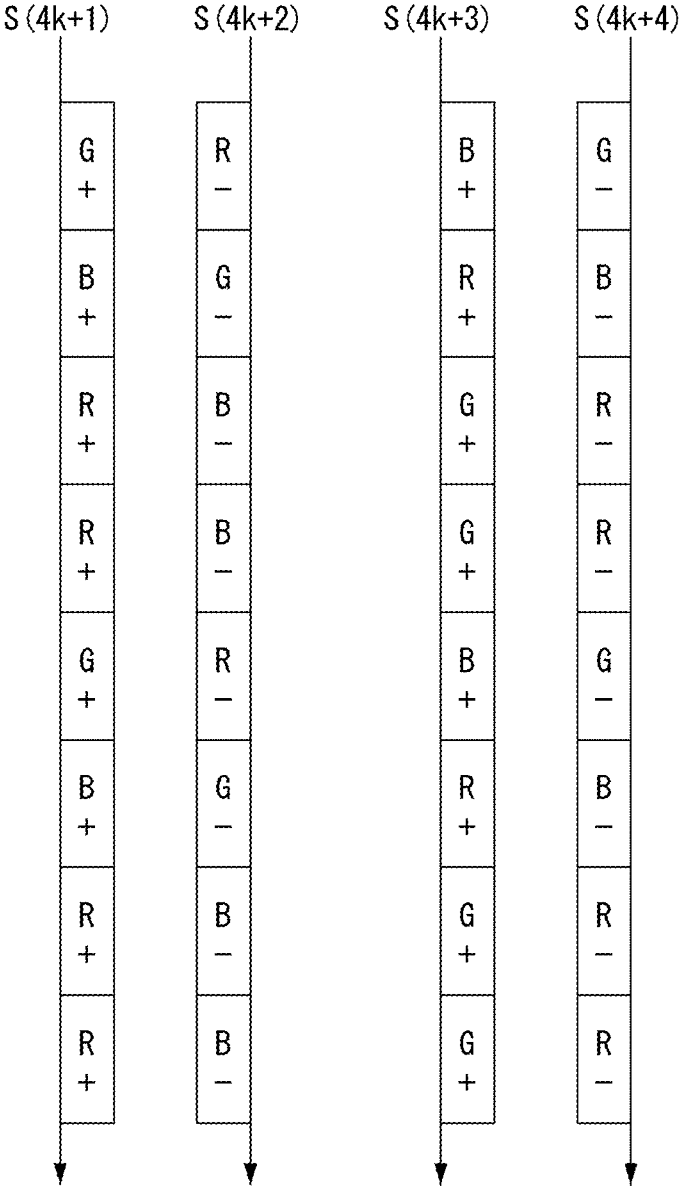

FIGS. 7 and 8 show a structure of a pixel array and a charge order of a data voltage according to a second embodiment. More specifically, FIG. 7 shows an example where the structure of the pixel array according to the first embodiment is applied to a liquid crystal display, in which subpixels of three primary colors (RGB) form one pixel. FIG. 8 shows an output order of the data voltage in the second embodiment shown in FIG. 7.

Referring to FIG. 7, in the liquid crystal display according to the second embodiment, R, G, and B subpixels are sequentially arranged on a row. The subpixels of the same color are arranged on the same column line.

A (4k+1)th data line S(4k+1) is connected to the G subpixels and the B subpixels arranged on a (4i+1)th column C(4i+1) and a (4i+2)th column C(4i+2) of odd-numbered rows L1 and L3 and is connected to the R subpixels arranged on a (4i)th column and a (4i+3)th column C(4i+3) of even-numbered rows L2 and L4.

A (4k+2)th data line S(4k+2) is connected to the R subpixels and the G subpixels arranged on the (4i+3)th column C(4i+3) and the (4i+4)th column C(4i+4) of the odd-numbered rows L1 and L3 and is connected to the B subpixels arranged on the (4i+2)th column C(4i+2) and the (4i+5)th column of the even-numbered rows L2 and L4.

A (4k+3)th data line S(4k+3) is connected to the B subpixels and the R subpixels arranged on the (4i+5)th column and the (4i+6)th column of the odd-numbered rows L1 and L3 and is connected to the G subpixels arranged on the 4(i+4)th column C(4i+4) and the 4(i+7)th column of the even-numbered rows L2 and L4.

Two gate lines may be arranged between two adjacent rows Li, e.g., gate lines G2 and G3 between rows L1 and L2. The subpixels arranged on one row Li may be connected alternately to an odd-numbered gate line and to an even-numbered gate line. For example, the subpixels on row L1 are alternately connected to gate lines G1 and G2. In other words, a first gate line G1 is connected to odd-numbered subpixels among the subpixels arranged on the first row L1, and a second gate line G2 is connected to even-numbered subpixels among the subpixels arranged on the first row L1. Adjacent odd-numbered gate lines may be connected to subpixels arranged in even-numbered and odd-numbered columns, respectively, so that odd-numbered gate lines connected to subpixels arranged in even-numbered columns and odd-numbered gate lines connected to subpixels arranged in odd-numbered columns alternate. For instance, odd-numbered gate line G1 is connected to odd-numbered columns C(4i+1) and C(4i+3), and adjacent odd-numbered gate line G3 is connected to even-numbered columns C(4i+2) and C(4i+4). In other words, a first odd-numbered gate line may be connected to even-numbered subpixels and an adjacent second odd-numbered gate line may be connected to odd-numbered subpixels.

The source driver IC performs a horizontal 2-dot column inversion drive. Namely, the source driver IC supplies a positive data voltage to the (4k+1)th and (4k+3)th data lines S(4k+1) and S(4k+3) and supplies a negative data voltage to the (4k+2)th and (4k+4)th data lines S(4k+2) and S(4k+4). A polarity relationship of the data voltages supplied to the data lines is equally maintained among the data lines. However, the polarity itself may change in a frame inversion mode, so that the source driver IC supplies the negative data voltage to the (4k+1)th and (4k+3)th data lines S(4k+1) and S(4k+3) and supplies the positive data voltage to the (4k+2)th and (4k+4)th data lines S(4k+4) and S(4k+4) in a subsequent frame.

As described above, the structure of the pixel array according to the first embodiment may be applied to the liquid crystal display, in which subpixels of three primary colors (RGB) form one pixel in a state where a connection structure of the data lines and the gate lines is maintained in the same manner as the first embodiment. Thus, the structure of the pixel array according to the first embodiment may be applied to the WRGB liquid crystal display or the RGB liquid crystal display by replacing only the color filter substrate. Further, positive and negative data voltage may be alternately supplied to the data lines.

Figure 9:
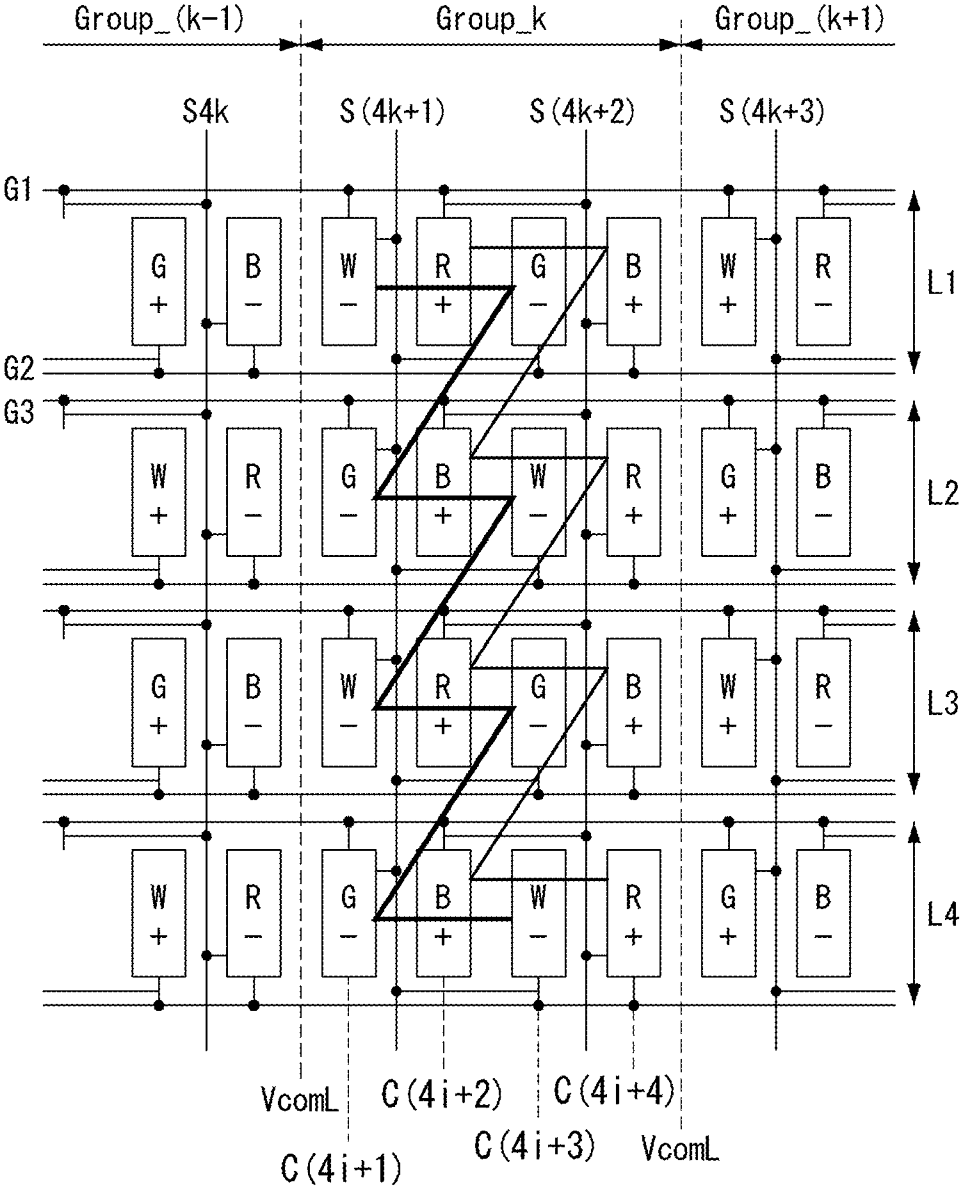
FIGS. 9 and 10 illustrate a structure of a pixel array and a charge order of a data voltage according to a third embodiment.
Figure 10:
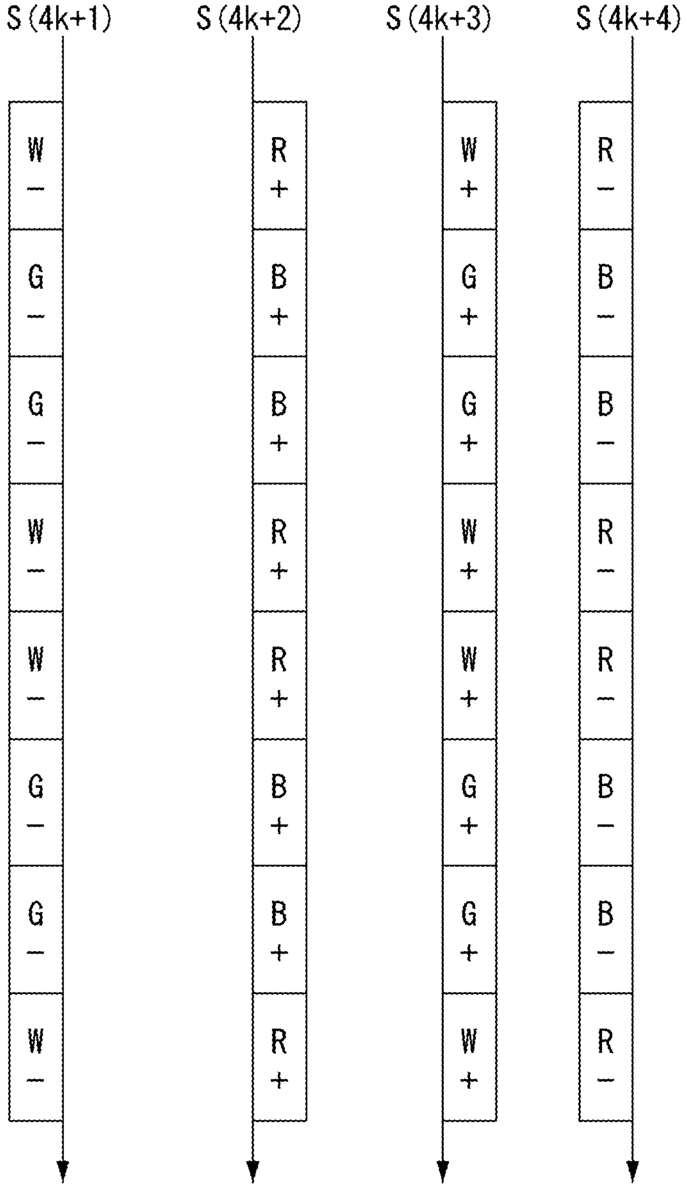

FIGS. 9 and 10 show a structure of a pixel array and a charge order of a data voltage according to a third embodiment.

Referring to FIG. 9, the pixel array according to the third embodiment includes subpixels of first to fourth colors arranged along rows of a horizontal direction. For example, the first color subpixel is a white (W) subpixel, the second color subpixel is a red (R) subpixel, the third color subpixel is a green (G) subpixel, and the fourth color subpixel is a blue (B) subpixel. Subpixels of two colors (e.g., W and G) are alternately arranged on a column line. For example, the B subpixels and the R subpixels are alternately disposed on a (4i+1)th column C(4i+1), and subpixels of the other two colors (e.g., R and B) are alternately disposed on a (4i+2)th column C(4i+2), where "i" is a non-negative integer, i>0. That is, in FIG. 9, only a middle part of the panel is shown, starting from data line S4k and column C4i.

Thus, the W subpixels are disposed at crossings of the (4i+1)th column C(4+1) and odd-numbered rows L1 and L3. The G subpixels are disposed at crossings of the (4i+1)th column C(4i+1) and even-numbered rows L2 and L4.

The R subpixels are disposed at crossings of the (4i+2)th column C(4i+2) and the odd-numbered rows L1 and L3. The B subpixels are disposed at crossings of the (4i+2)th column C(4i+2) and the even-numbered rows L2 and L4.

The G subpixels are disposed at crossings of a (4i+3)th column C(4i+3) and the odd-numbered rows L1 and L3. The W subpixels are disposed at crossings of the (4i+3)th column C(4i+3) and the even-numbered rows L2 and L4.

The B subpixels are disposed at crossings of a (4i+4)th column C(4i+4) and the odd-numbered rows L1 and L3. The R subpixels are disposed at crossings of the (4i+4)th column C(4i+4) and the even-numbered rows L2 and L4.

A (4k+1)th data line S(4k+1) is connected to the G subpixel and the W subpixel arranged on a row, where "k" is a positive integer, k >1. In particular, the (4k+1)th data line S(4k+1) is connected to the W subpixels and the G subpixels arranged on the (4i+1)th column C(4i+1) and the (4i+3)th column C(4i+3) of the odd-numbered rows L1 and L3 and is connected to the G subpixels and the W subpixels arranged on the (4i+1)th column C(4i+1) and the (4i+3)th column C(4i+3) of the even-numbered rows L2 and L4.

A (4k+2)th data line S(4k+2) is connected to the R subpixel and the B subpixel arranged on a row. In particular, the (4k+2)th data line S(4k+2) is connected to the R subpixels and the B subpixels arranged on the (4i+2)th column C(4i+2) and the (4i+4)th column C(4i+4) of the odd-numbered rows L1 and L3 and is connected to the B subpixels and the R subpixels arranged on the (4i+2)th column C(4i+2) and a (4i+5)th column C(4i+5) of the even-numbered rows L2 and L4.

The subpixels in one column may be connected to the same data line. For example, the subpixels in column C(4i+1) are all connected to data line S(4k+1). In the row L1, the odd-numbered subpixels, e.g., the subpixels of odd-numbered columns C(4i+1) and C(4i+3), are connected to an odd-numbered data line, e.g., S(4k+1). Likewise, within one row, the even-numbered subpixels, e.g., the subpixels of even-numbered columns C(4i+2) and C(4i+4), are connected to even-numbered data lines. Subpixels in one column may be connected to the same type of gate line, the type of gate line being either even-numbered or odd-numbered. That is, subpixels in columns C(4i+1) or C(4i+2) are connected to odd-numbered gate lines G1, G3, etc. Two adjacent subpixels in one row may be connected to one, e.g., an odd-numbered, gate line. The subsequent two adjacent subpixels in said one row may be connected to another one, e.g., an even-numbered, gate line. Hence, the subpixels W and R in row L1 are connected to gate line G1, and the subpixels G and B in row L1 are connected to gate line G2. Here, an odd-numbered data line S(4k+1) or S(4k+3) is arranged between the two adjacent subpixels W and R, which are connected to the odd-numbered gate line G1.

For example, the first gate line G1 is connected to odd-numbered subpixels among the subpixels arranged on the first row L1, and the second gate line G2 is connected to even-numbered subpixels among the subpixels arranged on the first row L1. For example, the first gate line G1 is connected to the W and R subpixels on the first row L1, and the second gate line G2 is connected to the G and B subpixels on the first row L1.

The source driver IC performs a horizontal 2-dot column inversion drive. Namely, the source driver IC supplies a negative data voltage to the (4k)th and (4k+1)th data lines S(4k) and S(4k+1) and supplies a positive data voltage to the (4k+2)th and (4k+3)th data lines S(4k+2) and S(4k+3). A polarity relationship of the data voltages supplied to the data lines is equally maintained among the data lines. That is, the polarity itself may change in a frame inversion mode, so that the source driver IC supplies the positive data voltage to the (4k)th and (4k+1)th data lines S(4k) and S(4k+1) and supplies the negative data voltage to the (4k+2)th and (4k+3)th data lines S(4k+2) and S(4k+3) in a subsequent frame.

The gate driver 104 sequentially supplies the gate pulses to the gate lines. A first gate pulse supplied to the first gate line G1 is synchronized with the data voltage supplied to subpixels connected to the first gate line G1 and disposed on the first row L1. A second gate pulse supplied to the second gate line G2 is synchronized with the data voltage supplied to subpixels connected to the second gate line G2 and disposed on the first row L1. That is, the gate pulses of the gate lines are synchronized with the data voltages supplied via the data lines.

As a result, in the pixel array according to the third embodiment, the subpixels connected to the (4k+1)th data line S(4k+1) are charged to the data voltage of the same polarity (e.g., negative polarity) in order of the W subpixel of the first row L1, the G subpixel of the first row L1, the G subpixel of the second row L2, and the W subpixel of the second row L2. Further, the subpixels connected to the (4k+2)th data line S(4k+2) are charged to the data voltage of the same polarity (e.g., positive polarity) in order of the R subpixel of the first row L1, the B subpixel of the first row L1, the B subpixel of the second row L2, and the R subpixel of the second row L2.

As described above, in the liquid crystal display having the structure of the pixel array according to the third embodiment, the positive and negative polarities of the data voltages supplied to the subpixels of the same color arranged on a row are balanced. Thus, the liquid crystal display according to the third embodiment can prevent a horizontal crosstalk generated by an imbalance of the polarities of the data voltages supplied to the subpixels arranged on a row. Further, as shown in FIG. 10, in the liquid crystal display according to the third embodiment, the data voltage supplied to a data line maintains the same polarity. Thus, because there is no data transition in the data output channels of the source driver IC, power consumption of the liquid crystal display according to the third embodiment may decrease. Since the principles of preventing (or reducing) the horizontal crosstalk and reducing the power consumption in the liquid crystal display according to the third embodiment are the same as in the first embodiment, a further description thereof may be omitted.

In the liquid crystal display according to the third embodiment, an odd-numbered data line and an even-numbered data line adjacent to one another form a pair. Two columns are connected to both the odd-numbered data line and the even-numbered data line. When the adjacent odd-numbered and even-numbered data lines are referred to as a data line group and the subpixels connected to the data line group are referred to as a subpixel group, a kth subpixel group Group_k and a (k+1)th subpixel group Group_(k+1) do not cross. That is, a subpixel group refers to four subsequent columns. Thus, a vertical common voltage line VcomL may be added to a boundary between the kth subpixel group Group_k and the (k+1)th subpixel group Group_(k+1) in the direction of the column line. The vertical common voltage line VcomL removes common voltage delay in the horizontal direction. If subpixels arranged on a row are supplied with common voltage in only the horizontal direction, a common voltage delay phenomenon occurs in the horizontal direction. On the other hand, the liquid crystal display according to the third embodiment may remove a common voltage delay phenomenon in the horizontal direction through the common voltage line formed in the vertical direction, thereby preventing a luminance deviation.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A liquid crystal display comprising:
- subpixels including a first color subpixel, a second color subpixel, a third color subpixel, and a fourth color subpixel;
- a first data line connected to a first set of two colors of subpixels among the subpixels on each row;
- a second data line connected to a second set of another two colors of subpixels different from the two colors of subpixels connected to the first data line on each row;
- a first gate line connected, on each row, to a third set of two colors of subpixels among the subpixels;
- a second gate line connected, on each row, to a fourth set of another two colors of subpixels different from the two colors of subpixels connected to the first gate line;
- a data driver configured to supply a data voltage to the first data line and the second data lines in a time-division manner, the data driver maintaining, during a frame period, a polarity of the data voltage supplied to the first data line and a polarity of the data voltage supplied to the second data line; and
- a gate driver configured to supply gate pulses to the first gate line and the second gate line in synchronization with an output timing of the data voltage.

2. The liquid crystal display of claim 1,
- wherein a (4k+1)th data line is adjacently disposed between a (4i+1)th column line and a (4i+2)th column line, and a (4k+2)th data line is adjacently disposed between a (4i+3)th column line and a (4i+4)th column line, where "i" and "k" are non-negative integers,
- wherein the fourth color subpixel, the first color subpixel, the second color subpixel, and the third color subpixel are respectively disposed on the (4i+1)th to (4i+4)th column lines of an odd-numbered row, and
- wherein the second color subpixel, the third color subpixel, the fourth color subpixel, and the first color subpixel are respectively disposed on the (4i+1)th to (4i+4)th column lines of an even-numbered row adjacent to the odd-numbered row.

3. The liquid crystal display of claim 2,
- wherein the (4k+1)th data line is connected to the fourth color subpixel on the (4i+1)th column line of the odd-numbered row, the first color subpixel on the (4i+2)th column line of the odd-numbered row, the first color subpixel on a (4i)th column line of the even-numbered row, and the fourth color subpixel on the (4i+3)th column line of the even-numbered row, and
- wherein the (4k+2)th data line is connected to the second color subpixel on the (4i+3)th column line of the odd-numbered row, the third color subpixel on the (4i+4)th column line of the odd-numbered row, the third color subpixel on the (4i+2)th column line of the even-numbered row, and the second color subpixel on a (4i+5)th column line of the even-numbered row.

4. The liquid crystal display of claim 2, wherein the first gate line of the odd-numbered row is connected to the fourth color subpixel and the second color subpixel arranged on the odd-numbered row, wherein the second gate line of the odd-numbered row is connected to the first color subpixel and the third color subpixel arranged on the odd-numbered row, wherein the first gate line of the even-numbered row is connected to the first color subpixel and the third color subpixel arranged on the even-numbered row, and wherein the second gate line of the even-numbered row is connected to the second color subpixel and the fourth color subpixel arranged on the even-numbered row.

5. The liquid crystal display of claim 2, wherein the data driver supplies one of a positive data voltage and a negative data voltage to the (4k+1)th data line and the (4k+2)th data line and supplies the other of the positive data voltage and the negative data voltage to a (4k+3)th data line and a (4k+4)th data line adjacent to the (4k+1)th data line and the 4(k+2)th data line.

6. The liquid crystal display of claim 2, wherein the data driver is configured to:

drive the first color subpixel on the odd-numbered row through the (4k+1)th data line, drive the second color subpixel on the odd-numbered row through the (4k+1)th data line immediately after driving the first color subpixel on the odd-numbered row, and drive the second color subpixel on the even-numbered row through the (4k+1)th data line immediately after driving the second color subpixel on the odd-numbered row, and drive the first color subpixel on the even-numbered row through the (4k+1)th data line immediately after driving the second color subpixel on the even-numbered row.

7. The liquid crystal display of claim 1, wherein a (4k+1)th data line is adjacently disposed between a (4i+1)th column line and a (4i+2)th column line, and a (4k+2)th data line is adjacently disposed between a (4i+3)th column line and a (4i+4)th column line, where "i" and "k" are non-negative integers, wherein the first color subpixel, the second color subpixel, the third color subpixel, and the fourth color subpixel are respectively disposed on the (4i+1)th to (4i+4)th column lines of an odd-numbered row, and wherein the third color subpixel, the fourth color subpixel, the first color subpixel, and the second color subpixel are respectively disposed on the (4i+1)th to (4i+4)th column lines of an even-numbered row adjacent to the odd-numbered row.

8. The liquid crystal display of claim 7, wherein the (4k+1)th data line is connected to the first color subpixel on the (4i+1)th column line of the odd-numbered row, the third color subpixel on the (4i+3)th column line of the odd-numbered row, the third color subpixel on the (4i+1)th column line of the even-numbered row, and the first color subpixel on the (4i+3)th column line of the even-numbered row, and wherein the (4k+2)th data line is connected to the second color subpixel on the (4i+2)th column line of the odd-numbered row, the fourth color subpixel on the (4i+4)th column line of the odd-numbered row, the fourth color subpixel on the (4i+2)th column line of the even-numbered row, and the second color subpixel on the (4i+4)th column line of the even-numbered row.

9. The liquid crystal display of claim 7, wherein the first gate line of the odd-numbered row is connected to the first color subpixel and the second color subpixel arranged on the odd-numbered row, wherein the second gate line of the odd-numbered row is connected to the third color subpixel and the fourth color subpixel arranged on the odd-numbered row, wherein the first line of the even-numbered row is connected to the third color subpixel and the fourth color subpixel arranged on the even-numbered row, and wherein the second gate line of the odd-numbered row is connected to the first color subpixel and the second color subpixel arranged on the even-numbered row.

10. The liquid crystal display of claim 7, wherein the data driver supplies one of a positive data voltage and a negative data voltage to the (4k+1)th data line and supplies the other of the positive data voltage and the negative data voltage to the (4k+2)th data line.

11. The liquid crystal display of claim 7, wherein the (4k+1)th data line and the (4k+2)th data line are disposed between a first vertical common voltage line and a second vertical common voltage line, wherein the first vertical common voltage line is adjacent to the first color subpixel on the (4i+1)th column line of the odd-numbered row and the third color subpixel on the (4i+1)th column line of the even-numbered row, and wherein the second vertical common voltage line is adjacent to the fourth color subpixel on the (4i+4)th column line of the odd-numbered row and the second color subpixel on the (4i+4)th column line of the even-numbered row.

12. The liquid crystal display of claim 7, wherein the data driver is configured to:

drive the first color subpixel on the odd-numbered row through the (4k+1)th data line, drive the third color subpixel on the odd-numbered row through the (4k+1)th data line immediately after driving the first color subpixel on the odd-numbered row, drive the third color subpixel on the even-numbered row through the (4k+1)th data line immediately after driving the third color subpixel on the odd-numbered row, and drive the first color subpixel on the even-numbered row through the (4k+1)th data line immediately after driving the third color subpixel on the even-numbered row.

13. The liquid crystal display of claim 1, wherein the first gate line is not connected to any subpixels connected to the second gate line, and wherein the second gate line is not connected to any subpixels connected to the first gate line.

14. The liquid crystal display of claim 1, wherein the first data line is not connected to any subpixels connected to the second data line, and wherein the second data line is not connected to any subpixels connected to the first data line.

15. The liquid crystal display of claim 1, wherein a first half of subpixels of the first color on each row are connected to a first set of data lines that the data driver supplies with a positive data voltage during a gate pulse, wherein a second half of subpixels of the first color on each row are connected to a second set of data lines that the data driver supplies supplied with a negative data voltage during the gate pulse, and wherein the first set of data lines are alternately disposed with the second set of data lines.

16. The liquid crystal display of claim 1, wherein the first color subpixel and the second color subpixel are connected to different gate lines, and wherein the third color subpixel and the fourth color subpixel are connected to different gate lines.

* * * * *